US009215335B1

(12) United States Patent
Nas et al.

(10) Patent No.: US 9,215,335 B1
(45) Date of Patent: Dec. 15, 2015

(54) METHODS FOR OPTIMIZING ESTABLISHING CONNECTIONS TO AND FACILITATING OFFERS OF ROAMING SERVICES AND DEVICES THEREOF

(71) Applicant: Traffix Communication Systems Ltd., Tel Aviv (IL)

(72) Inventors: Petrus Wilhelmus Adrianus Jacobus Maria Nas, The Hague (NL); Pavol Porazik, Munich (DE); Martin Oravec, The Hague (NL); Petro Flomin, Herzelia (IL); Leonid Ridel, Hod Hasharon (IL); Sagiv Goren, Raanana (IL)

(73) Assignee: TRAFFIX COMMUNICATION SYSTEMS LTD., Tel Aviv (IL)

( * ) Notice: Subject to any disclaimer, the term of this patent is extended or adjusted under 35 U.S.C. 154(b) by 0 days.

(21) Appl. No.: 14/579,696

(22) Filed: Dec. 22, 2014

Related U.S. Application Data

(60) Provisional application No. 61/919,504, filed on Dec. 20, 2013.

(51) Int. Cl.
  H04M 11/00 (2006.01)
  H04M 15/00 (2006.01)
  H04W 8/02 (2009.01)
  H04W 8/04 (2009.01)
  H04W 8/06 (2009.01)
  H04W 88/16 (2009.01)

(52) U.S. Cl.
  CPC ............... H04M 15/66 (2013.01); H04W 8/02 (2013.01); H04W 8/04 (2013.01); H04W 8/06 (2013.01); H04W 88/16 (2013.01)

(58) Field of Classification Search
  CPC ......... H04M 15/66; H04W 8/02; H04W 8/04; H04W 8/06
  USPC ........... 455/406, 405, 407, 408, 456.1, 435.1, 455/436
  See application file for complete search history.

(56) References Cited

U.S. PATENT DOCUMENTS

| 8,958,306 | B2 * | 2/2015 | McCann et al. | 370/241 |
| 2010/0136967 | A1 * | 6/2010 | Du et al. | 455/432.3 |
| 2011/0217978 | A1 * | 9/2011 | Horn | 455/433 |
| 2012/0129488 | A1 * | 5/2012 | Patterson et al. | 455/406 |
| 2013/0279401 | A1 * | 10/2013 | Sander et al. | 370/328 |

Primary Examiner — Khai M Nguyen

* cited by examiner

(74) Attorney, Agent, or Firm — LeClairRyan, a Professional Corporation

(57) ABSTRACT

A method, non-transitory computer readable medium, and device that optimizes establishing connections to and facilitating offers of roaming services, the method includes adding, by a diameter roaming gateway controller device, a domain name of a packet data network gateway in the home network system to an update location answer received in response to an update location request from a home subscriber system in a home network system associated with a roaming mobile computing device. The update location answer is sent, by the diameter roaming gateway controller device, to a mobility management entity in a visited network. Redirect information is added, by the diameter roaming gateway controller device, to a credit control answer received from the policy charging and rules function element in the home network system in response to a credit control request message generated by a packet data network gateway in the home network system. The redirect information provides instruction to route communications from the roaming mobile computing device to a landing server device. An update on a roaming provider for the roaming mobile computing device is received, by the diameter roaming gateway controller device, from the mobility management entity in the visited network which received a selection of the roaming provider from the landing server device.

18 Claims, 7 Drawing Sheets

METHODS FOR OPTIMIZING ESTABLISHING CONNECTIONS TO AND FACILITATING OFFERS OF ROAMING SERVICES AND DEVICES THEREOF

This application claims the benefit of U.S. Provisional Patent Application Ser. No. 61/919,504 filed Dec. 20, 2013, which is hereby incorporated by reference in its entirety.

FIELD

This technology generally relates to roaming services for wireless devices and, more particularly, to methods for optimizing establishing connections to and facilitating offers of roaming services and devices thereof.

BACKGROUND

Both leisure and business travelers are already accustomed to continuing to use their smartphones during a visit to a foreign country. The only remaining barriers that minimize smartphone or other mobile computing device use by these travelers, also known as roamers, are high roaming rates and the difficulty in choosing a plan to provide access during the trip. As a result, to keep costs down roamers often will switch off data roaming in the settings of their smartphone or other mobile computing device and only use a visited roaming network for voice calls and SMS. These roamers often will wait to find a Wi-Fi network to access the internet for data services.

Unfortunately, from the perspective of both the home network system and the visited network system, this typical behavior results in a huge loss of potential revenue. As a result, this currently is costing this industry billions of dollars each year in lost revenue because roaming customers are not able to quickly and easily determine whether an affordable roaming package might be available.

SUMMARY

A method for optimizing establishing connections to and facilitating offers of roaming services, the method includes adding, by a diameter roaming gateway controller device, a domain name of a packet data network gateway in the home network system to an update location answer received in response to an update location request from a home subscriber system in a home network system associated with a roaming mobile computing device. The update location answer is sent, by the diameter roaming gateway controller device, to a mobility management entity in a visited network. Redirect information is added, by the diameter roaming gateway controller device, to a credit control answer received from the policy charging and rules function element in the home network system in response to a credit control request message generated by a packet data network gateway in the home network system. The redirect information provides instruction to route communications from the roaming mobile computing device to a landing server device. An update on a roaming provider for the roaming mobile computing device is received, by the diameter roaming gateway controller device, from the mobility management entity in the visited network which received a selection of the roaming provider from the landing server device.

A non-transitory computer readable medium having stored thereon instructions for optimizing establishing connections to and facilitating offers of roaming services comprising executable code which when executed by a processor, causes the processor to perform steps includes adding a domain name of a packet data network gateway in the home network system to an update location answer received in response to an update location request from a home subscriber system in a home network system associated with a roaming mobile computing device. The update location answer is sent to a mobility management entity in a visited network. Redirect information is added to a credit control answer received from the policy charging and rules function element in the home network system in response to a credit control request message generated by a packet data network gateway in the home network system. The redirect information provides instruction to route communications from the roaming mobile computing device to a landing server device. An update on a roaming provider for the roaming mobile computing device is received from the mobility management entity in the visited network which received a selection of the roaming provider from the landing server device.

A diameter roaming gateway controller device includes a memory coupled to a processor which is configured to be capable of executing programmed instructions comprising and stored in the memory to add a domain name of a packet data network gateway in the home network system to an update location answer received in response to an update location request from a home subscriber system in a home network system associated with a roaming mobile computing device. The update location answer is sent to a mobility management entity in a visited network. Redirect information is added to a credit control answer received from the policy charging and rules function element in the home network system in response to a credit control request message generated by a packet data network gateway in the home network system. The redirect information provides instruction to route communications from the roaming mobile computing device to a landing server device. An update on a roaming provider for the roaming mobile computing device is received from the mobility management entity in the visited network which received a selection of the roaming provider from the landing server device.

This technology provides a number of advantages including methods, non-transitory computer readable medium, and devices that optimize establishing connections to and facilitating offers of roaming services. With this technology, connections are established to identify available visiting networks are identified and presented before starting to consume wireless communication services. Additionally, with this technology an identified roaming mobile computing device is presented with a landing page which offers a list of one or more available roaming providers.

DETAILED DESCRIPTION

Figure 1:
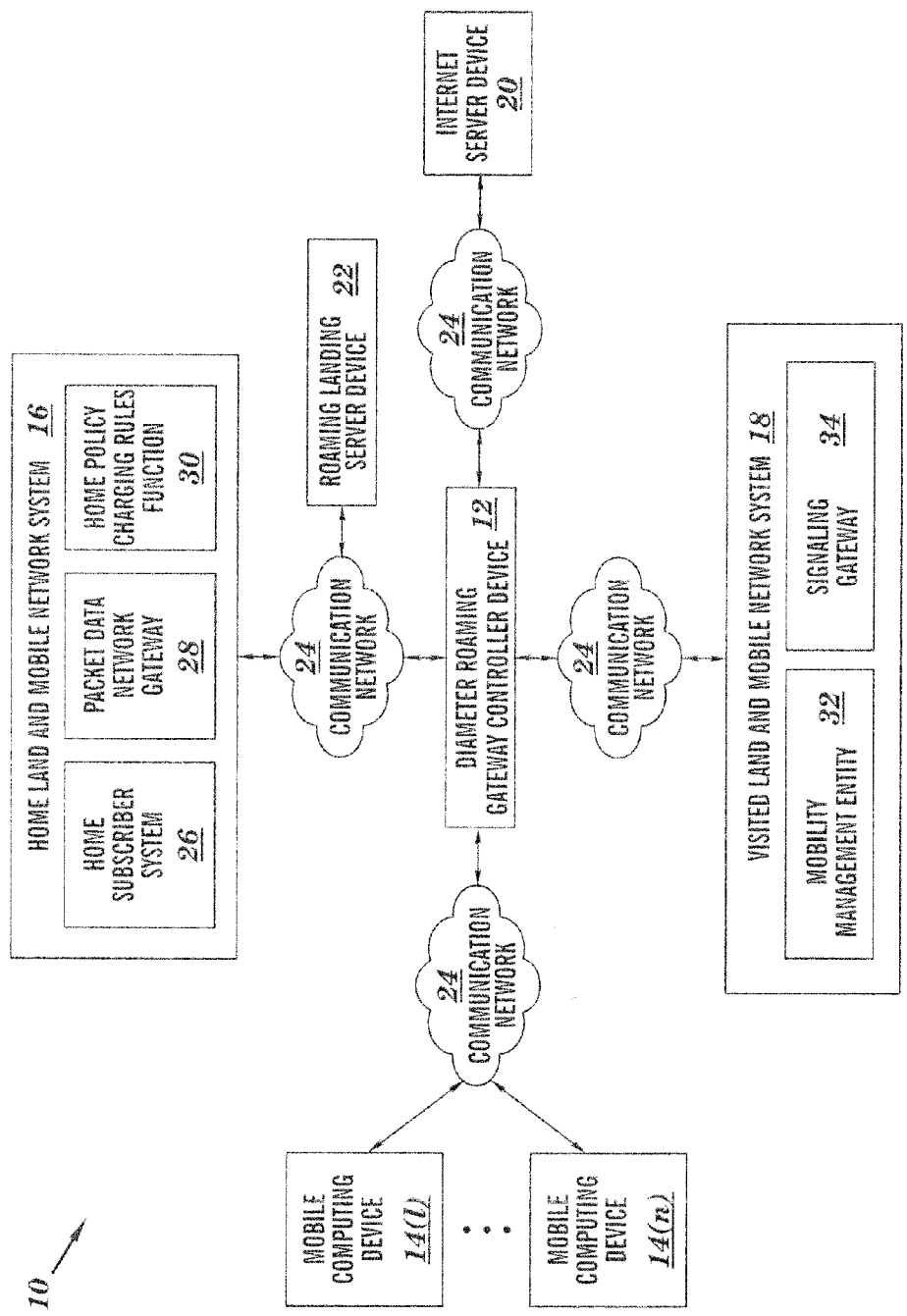
FIG. 1 is a block diagram of a communication network environment with an example of a diameter roaming gateway controller device that optimizes establishing connections to and facilitating offers of roaming services.
Figure 2:
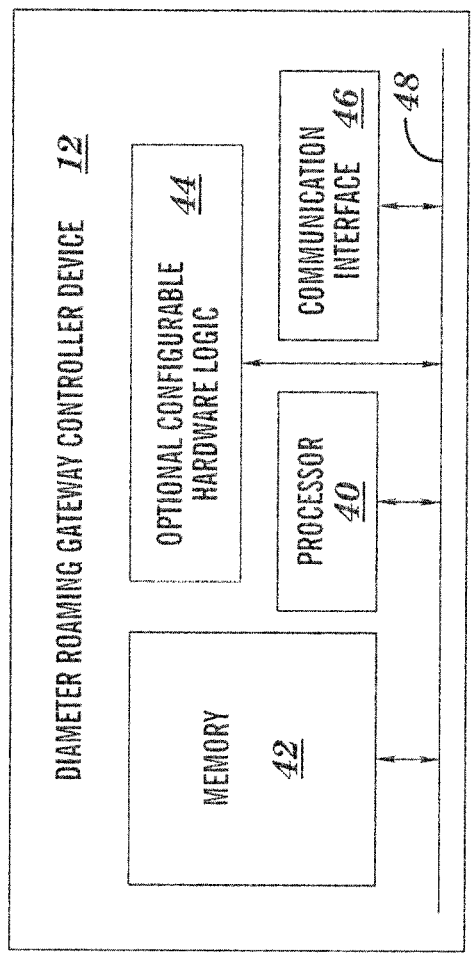
FIG. 2 is a block diagram of the example of the diameter roaming gateway controller device illustrated in FIG. 1.
Figure 3A:
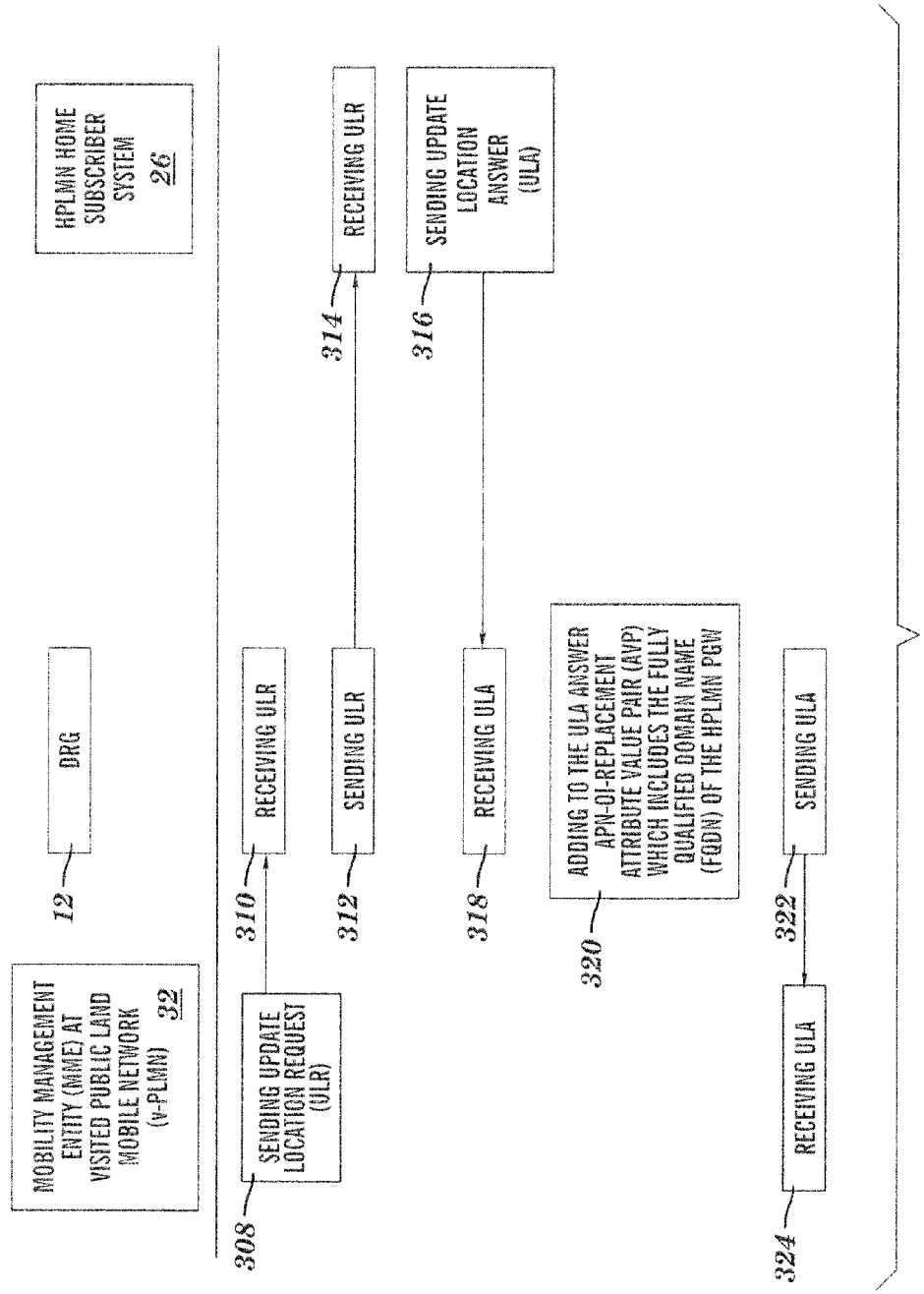
FIGS. 3A-3D are flow diagrams of an example of a method for optimizing establishing connections to and facilitating offers of roaming services.
Figure 3B:
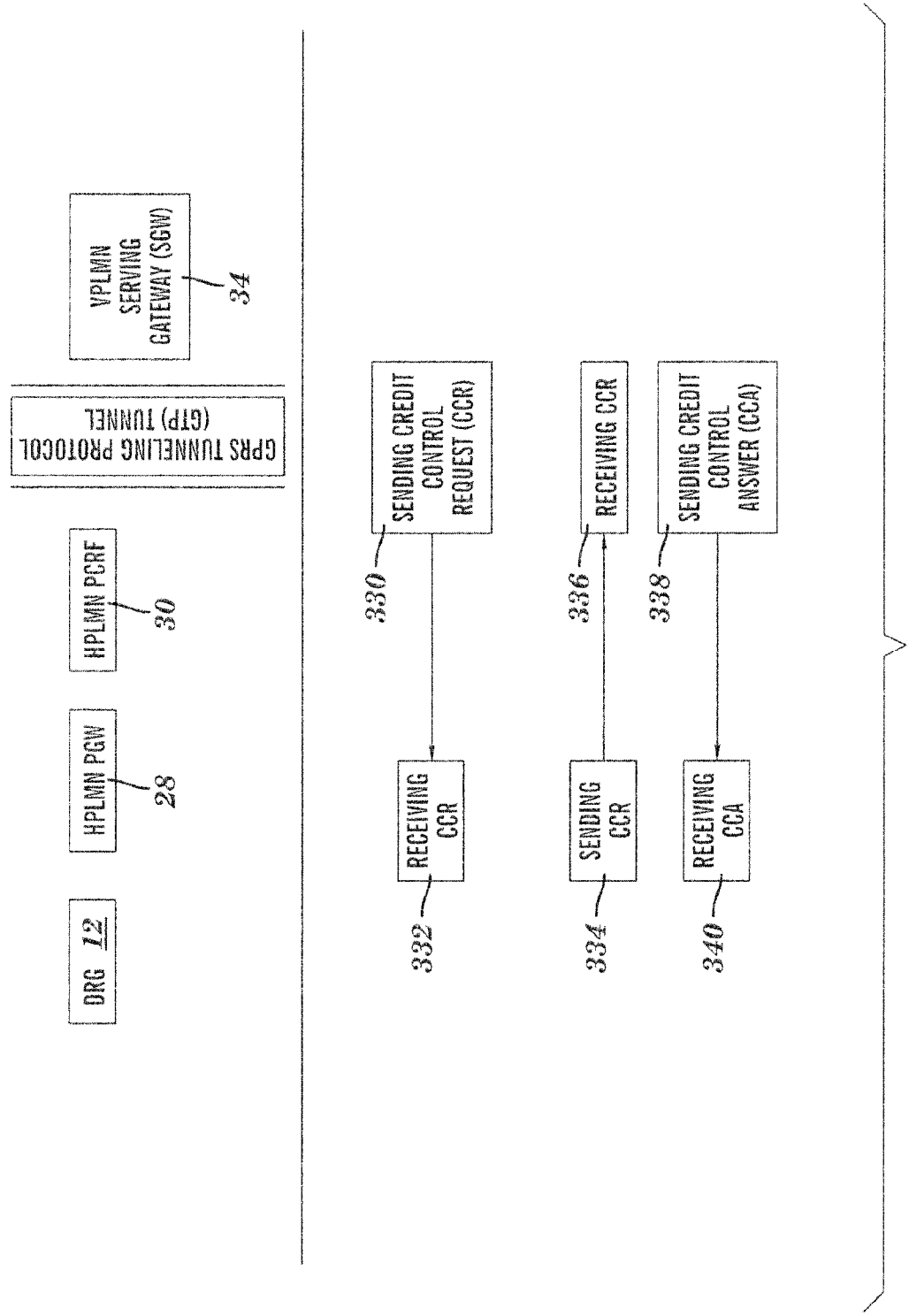
Figure 3C:
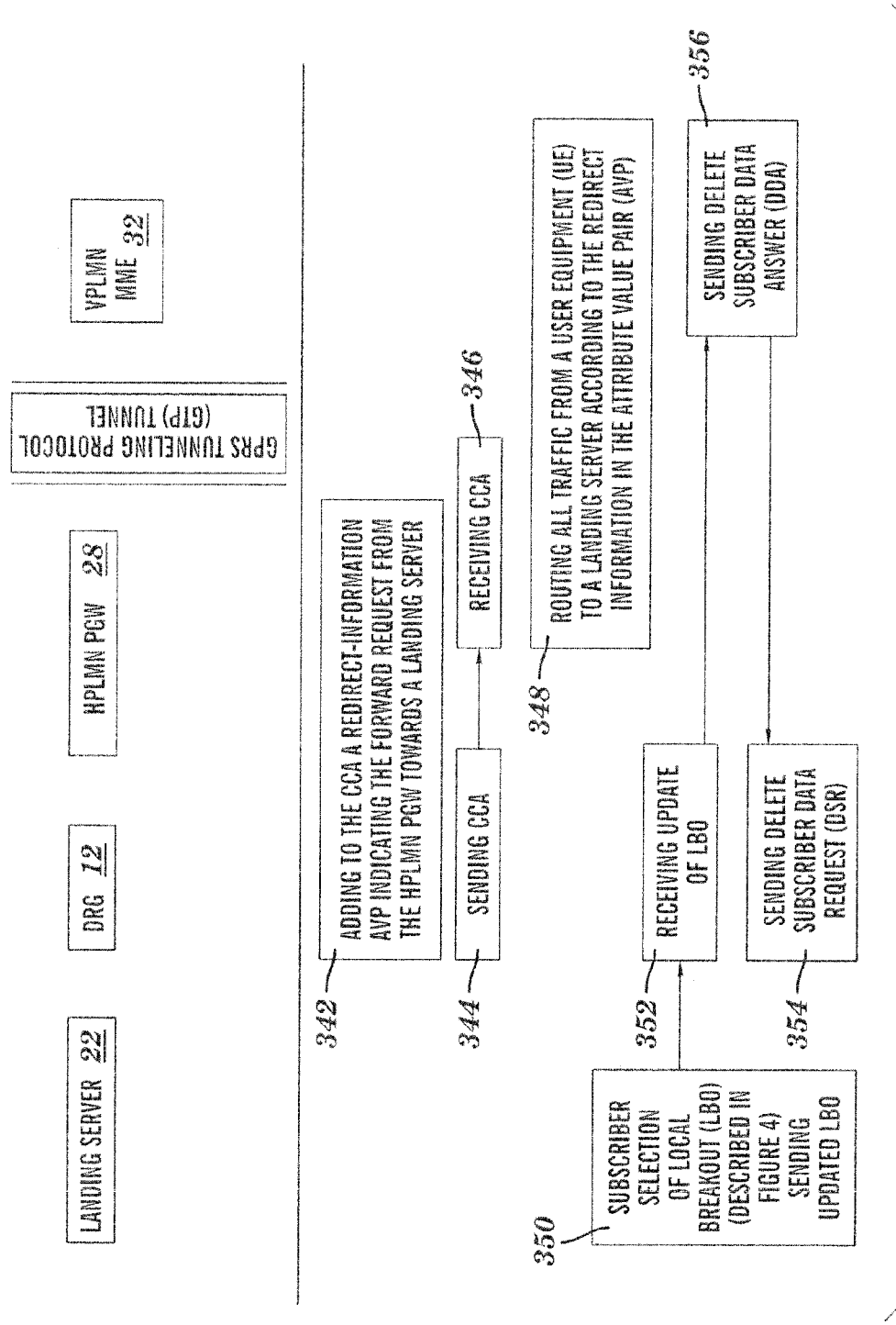
Figure 3D:
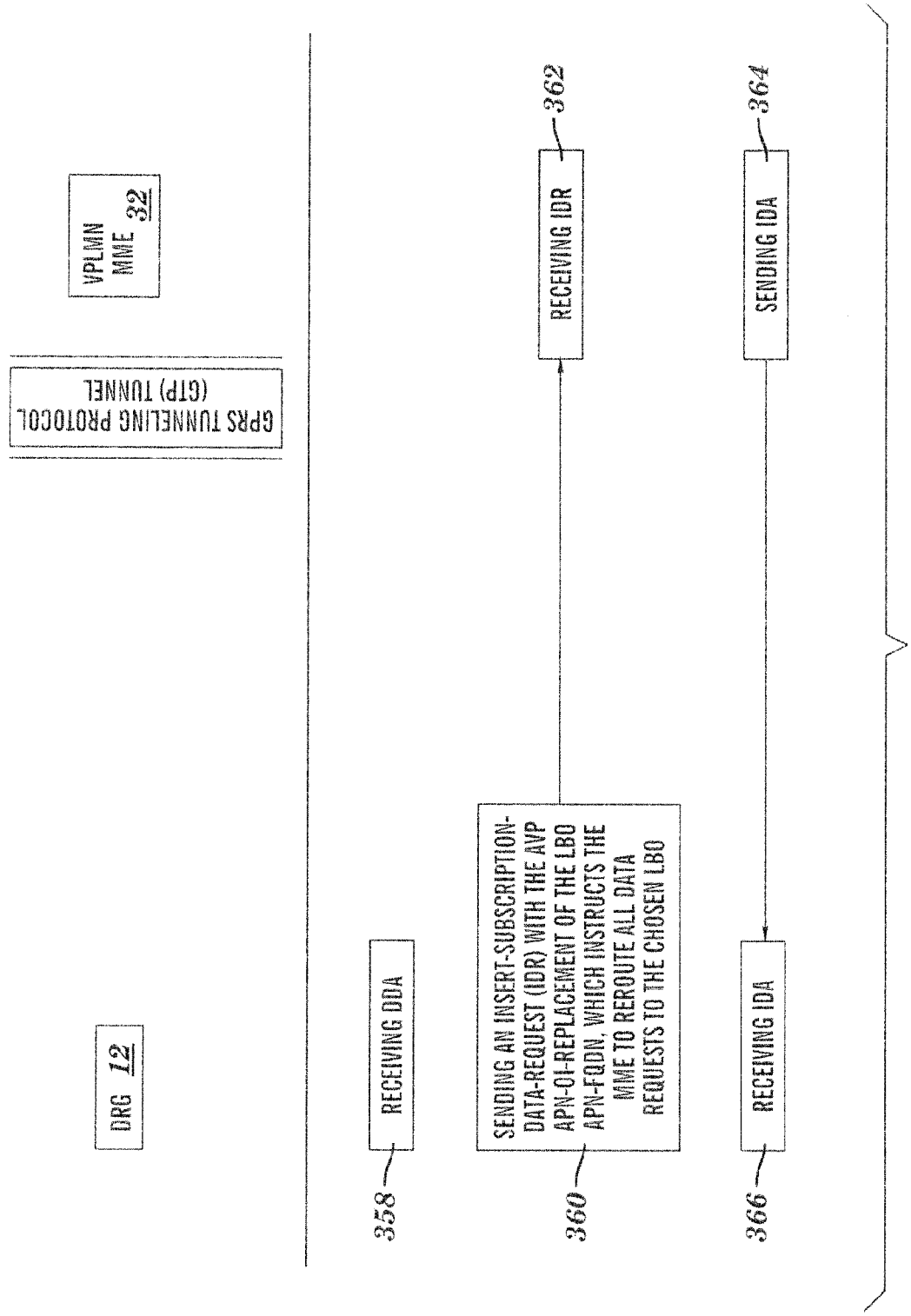

A communication network environment 10 with an example of a diameter roaming gateway controller device 12 that optimizes establishing connections to and facilitating offers of roaming services is illustrated in FIGS. 1-2. The exemplary environment 10 includes the diameter roaming gateway controller device 12, mobile computing devices 14(1)-14(n), a Home Public Land and Mobile Network System (HPLMN) 16, a Visited Public Land and Mobile Network System (VPLMN) 18, an internet server device 20, a roaming landing server device 22 which are coupled together by one or more communication networks 24, although the environment can include other types and numbers of systems, devices, components, and/or elements and in other topologies and deployments. While not shown, the exemplary environment 10 may include other types and/or numbers of other network systems, devices, components and/or other elements, such as routers, switches and other devices, which are well known to those of ordinary skill in the art and thus will not be described here. This technology provides a number of advantages including providing a method, non-transitory computer readable medium and apparatus that optimizes establishing connections to and facilitating offers of roaming services.

Referring more specifically to FIGS. 1-2, the diameter roaming gateway controller device 12 assists with optimizing establishing connections to and facilitating offers of roaming services as illustrated and described with the examples herein, although diameter roaming gateway controller device 12 may be configured to be capable of performing other types and/or numbers of functions or other operations. In this example, the diameter roaming gateway controller device 12 is illustrated outside of the Home Public Land and Mobile Network System (HPLMN) 16 and the Visited Public Land and Mobile Network System (VPLMN) 18, although the diameter roaming gateway controller device 12 could be in one of those networks systems, such as the Home Public Land and Mobile Network System (HPLMN) 16. The diameter roaming gateway controller device 12 in this example may enable connectivity between network elements in the Home Public Land and Mobile Network System (HPLMN) 16 and the Visited Public Land and Mobile Network System (VPLMN) 18 and supports interconnectivity in roaming. The diameter roaming gateway controller device 12 may have multiple interfaces for communication between systems, devices, components and/or other elements in the Home Public Land and Mobile Network System (HPLMN) 16 and the Visited Public Land and Mobile Network System (VPLMN) 18. By way of example only, the diameter roaming gateway controller device 12 may have an interface S6 for communication between Mobility Management Entity (MME) 32 in Visited Public Land and Mobile Network System (VPLMN) 18 and Home Subscriber System (HSS) 26 in Home Public Land and Mobile Network System (HPLMN) 16. By way of another example only, the diameter roaming gateway controller device 12 may have another interface S8 for communication between Serving Gateway (S-GW) (not shown) and Packet Data Network Gateway (P-GW) 28 in Home Public Land and Mobile Network System (HPLMN) 16. By way of yet another example only, the diameter roaming gateway controller device 12 may have another interface Gx for communication between Packet Data Network Gateway (P-GW) 28 in Home Public Land and Mobile Network System (HPLMN) 16 and Home Policy Charging Rules Function (PCRF) 30 in Home Public Land and Mobile Network System (HPLMN) 16. Additionally, in this example the diameter roaming gateway controller device 12 may provide Diameter routing functions targeting the requirements for routing international Diameter traffic. Further, in this example the diameter roaming gateway controller device 12 may allow one or more of the mobile computing devices 14(1)-14(n) to receive mobile services, such as user data (e.g. data from the internet), Short Message Service (SMS) and/or voice data by way of example only, from more than one provider of wireless communications services. Even further, the diameter roaming gateway controller device 12 may provide one or more of the mobile computing devices 14(1)-14(n) flexibility in receiving wireless communications services according to location, time and availability of service. The diameter roaming gateway device controller 12 also may manage requests to and responses from the internet server device 20 which may be transferred via the diameter roaming gateway controller device 12 to the Home Public Land and Mobile Network System (HPLMN) 16 or the Visited Public Land and Mobile Network System (VPLMN) 18 depending on the current subscriber systems selected by the mobile computing devices 14(1)-14(n). The diameter roaming gateway device controller 12 also may monitor when an user of one of the mobile computing devices 14(1)-14(n) is accessing local data services and may forward only the control signaling to the Home Public Land and Mobile Network System (HPLMN) 16 for billing purposes.

In this particular example, the diameter roaming gateway controller device 12 includes a processor 40, a memory 42, optional configurable hardware logic 44, and communication interface 46 which are coupled together by bus 48, although diameter roaming gateway controller device 12 may comprise other types and numbers of elements in other configurations. The processor 40 in the diameter roaming gateway controller device 12 may execute one or more computer-executable instructions stored in the memory in the diameter roaming gateway controller device 12 for the methods illustrated and described with reference to the examples herein, although the processor can execute other types and/or numbers of instructions and may be configured to be capable of performing other types and/or numbers of operations. The processor 40 in the diameter roaming gateway controller device 12 may comprise one or more central processing units ("CPUs") or general purpose processors with one or more processing cores, although other types of processor(s) could be used.

Memory 42 in the diameter roaming gateway controller device 12 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 42 in the diameter roaming gateway controller device 12 may store one or more non-transitory computer-readable programmed instructions of this technology as illustrated and described with reference to the examples herein that may be executed by the processor in the diameter roaming gateway controller device 12. The flow diagrams shown in FIGS. 3A-3D and 4 are representative of example steps or actions of this technology that may be embodied or expressed as one or more non-transitory computer or machine readable instructions stored in memory in the diameter roaming gateway controller device 12 that may be executed by the processor 40 in the diameter roaming gateway controller device 12 and/or may be implemented by configured logic in the optional configurable logic device in the diameter roaming gateway controller device 12.

The optional configurable hardware logic device 44 in the diameter roaming gateway controller device 12 may include specialized hardware configured to implement one or more steps or other aspects of this technology as illustrated and described with reference to the examples herein. By way of example only, the optional configurable logic device 44 may comprise one or more of field programmable gate arrays (FPGAs), field programmable logic devices (FPLDs), application specific integrated circuits (ASICs) and/or programmable logic units (PLUs), for example, although other types of configurable hardware logic devices can also be used. Additionally, in another optional alternative example, this technology may be implemented in a virtual environment on any kind of virtual infrastructure.

The communication interface 46 in the diameter roaming gateway controller device 12 is used to operatively couple and communicate between the diameter roaming gateway controller device 12 and one or more of the mobile computing devices 14(1)-14(n), the Home Public Land and Mobile Network System (HPLMN) 16, the Visited Public Land and Mobile Network System (VPLMN) 18, the internet server device 20, and the roaming landing server device 22 via one or more of the communication network 24 which each may comprise one or more local area networks (LAN) and/or the wide area network (WAN), although other types and numbers of communication networks or systems with other types and numbers of connections and configurations to other devices and elements. By way of example only, the communication networks 24, such as local area networks (LAN) and the wide area network (WAN), may use TCP/IP over Ethernet and industry-standard protocols, including NFS, CIFS, SOAP, XML, LDAP, Diameter, Radius, SS7 and SNMP, although other types and numbers of communication networks, can be used.

The mobile computing devices 14(1)-14(n) may each include a processor, a memory, a communication interface, an input device, and a display device, which are coupled together by a bus or other link, although the mobile computing devices can have other numbers and types of systems, devices, components, and/or elements in other configurations. By way of example only, the mobile computing devices may comprise mobile computing devices, smartphones, tablets, or other types of user equipment and/or any combination thereof.

In this example, the Home Public Land and Mobile Network System 16 and the Visited Public Land and Mobile Network System 18 each may comprise one or more different communication management systems, computing devices or servers, routers, switches, components, and/or other elements which may be coupled in a variety of different configurations. By way of example only, the Home Public Land and Mobile Network System 16 may include a Home Subscriber Server (HSS) 26, a Packet Data Network Gateway (PGW) 28 and a Home Policy Charging Rules Function (h-PCRF) 30, although the Home Public Land and Mobile Network System (HPLMN) 16 also could comprise other types and/or numbers of systems, computing devices or servers, routers, switches, components, modules and/or other elements in other configurations. Billing services for the wireless communications services consumed by operators of one or more of the mobile computing devices 14(1)-14(n) which are subscribers may be provided by the Home Public Land and Mobile Network System (HPLMN) 16.

Additionally, by way of example only, the Visited Public Land and Mobile Network System (VPLMN) 18 may include a Mobility Management Entity (MME) 32 and a Signalling Gateway 34, although the Visited Public Land and Mobile Network System 18 could comprise other types and/or numbers of systems, computing devices or servers, routers, switches, components, modules, and/or other elements.

Each of the systems, servers, devices and/or other components or elements in the Home Public Land and Mobile Network System (HPLMN) 16 and/or the Visited Public Land and Mobile Network System (VPLMN) 18 may include at least a processor, a memory with programmed instructions configured to be capable of managing various communication management operations and functions, although each may have other numbers and types of systems, devices, components, and/or elements in other configurations. For ease of illustration, only one Home Public Land and Mobile Network System (HPLMN) 16 and only one Visited Public Land and Mobile Network System (VPLMN) 18 are illustrated, although other types and/or numbers of each could be used.

In this example, the internet server device 20 may host content and/or applications which are accessible with and without billing charges by one or more of the mobile computing devices 14(1)-14(n), although other types and/or numbers of internet server devices could be used and the internet server device 20 may be configured to be capable of performing other types and/or numbers of other function or operations. The internet server device 20 includes a processor, a memory, and a communication interface, which are coupled together by a bus or other link, although the internet server device 20 can have other numbers and types of systems, devices, components, and/or elements in other configurations and locations. For ease of illustration only one internet server device 20 is shown, although other types and/or numbers could be used.

In this example, the roaming landing server device 22 generates and provides a landing page with offers for one or more roaming services with pricing and other details, such as the term during which service will be provided or data capacity limits by way of example only, although other types and/or numbers of other function or operations may be performed. Additionally, in other examples the operations and functions of the roaming landing server device 22 may be incorporated in as part of the diameter roaming gateway controller device 12.

The roaming landing server device 22 may be connected to the Home Public Land and Mobile Network System (HPLMN) 16. In another example, the roaming landing server device 22 may be integrated to be part of the diameter roaming gateway controller device 12. The roaming landing server device 22 may send a landing page to the roaming one of the mobile computing devices 14(1)-14(n) which may include offers including pricing and terms from one or more roaming providers based on the identified location of the roaming one of the mobile computing devices 14(1)-14(n). The roaming landing server device 22 includes a processor, a memory, and a communication interface, which are coupled together by a bus or other link, although the roaming landing server device 22 can have other numbers and types of systems, devices, components, and/or elements in other configurations and locations.

Although an exemplary environment 10 with the diameter roaming gateway controller device 12, the mobile computing devices 14(1)-14(n), the Home Public Land and Mobile Network System (HPLMN) 16, the Visited Public Land and Mobile Network System (VPLMN) 18, the Internet server device 20, the roaming landing server device 22 and communication networks 24 are described and illustrated herein, other types and numbers of systems, devices, blades, components, modules and/or elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as the non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for optimizing establishing connections to and facilitating offers of roaming services in LTE network and will now be described herein with reference to FIGS. 1-4. Referring more specifically to FIGS. 3A-3D, in this example when an owner of one of the mobile computing devices 14(1)-14(n) who is a subscriber of the Home Subscriber System 28 in the Home Public Land and Mobile Network System (HPLMN) 16 travels to a location in the Visited Public Land and Public Network System (VPLMN) 18, the Home Subscriber System 28 may want to offer services from one or more roaming providers for a portion of or the duration of travel of the one of the mobile computing devices 14(1)-14(n) outside the Home Public Land and Mobile Network System (HPLMN) 16.

Accordingly, in step 308 when the roaming one of the mobile computing devices 14(1)-14(n) is turned on at the new location outside the Home Public Land and Mobile Network System (HPLMN) 16, the mobility management entity (MME 240) in the Visited Public Land and Public Network System (VPLMN) 18 identifies the roaming one of the mobile computing devices 14(1)-14(n) and may send an Update Location Request (ULR) to the diameter roaming gateway controller device 12 which is received at step 210. In step 312, the diameter roaming gateway controller device 12 may send the Update Location Request (ULR) to the Home Subscriber System (HSS) 26 in the Home Public Land and Mobile Network System (HPLMN) 16.

In step 314, the Home Subscriber System (HSS) 26 in the Home Public Land and Mobile Network System (HPLMN) 16 may receive the Update Location Request (ULR) from the diameter roaming gateway controller device 12. In step 316, the Home Subscriber System (HSS) 26 in the Home Public Land and Mobile Network System (HPLMN) 16 may send an Update Location Answer (ULA) to the diameter roaming gateway controller device 12.

In step 318, the diameter roaming gateway controller device 12 receives the Update Location Answer (ULA) from the Home Subscriber System (HSS) 26 in the Home Public Land and Mobile Network System (HPLMN) 16. In step 320, diameter roaming gateway controller device 12 adds an APN-OI-Replacement Attribute Value Pair (AVP) which includes the Fully Qualified Domain Name (FQDN) of the Home Public Land and Mobile Network System (HPLMN) 16 to the Update Location Answer (ULA). The Access Point Name (APN) is provided as an identifier to determine what type of network connection should be created, for example what IP addresses should be assigned to the roaming one of the mobile computing devices 14(1)-14(n) and what security methods should be used.

In step 322, the diameter roaming gateway controller device 12 sends the modified Update Location Answer (ULA) to the Mobility Management Entity (MME) 32 in the Visited Public Land and Public Network System (VPLMN). In step 324, the Mobility Management Entity (MME) 32 in the Visited Public Land and Public Network System (VPLMN) 18 receives the modified Update Location Answer (ULA) from the diameter roaming gateway controller device 12.

Next, a GPRS Tunneling Protocol (GTP) tunnel is opened between the Visited Public Land and Public Network System (VPLMN) 18 and the Packet Data Network Gateway (P-GW) 28 in the Home Public Land and Mobile Network System (HPLMN) 16, although other types of connections with other protocols could be used. The GPRS Tunneling Protocol (GTP) is a group of IP-based communications protocols which are used to carry user data within GSM, UMTS, and LTE networks.

In step 330, the Packet Data Network Gateway (P-GW) 28 in the Home Public Land and Mobile Network System (HPLMN) 16 sends a Credit Control Request (CCR) to the diameter roaming gateway controller device 12. The Credit Control request (CCR) and a Credit Control answer (CCA)" refer to messages of a Diameter control which supports Credit Control via Diameter in a networking protocol for a Diameter application used to implement real-time credit-control for a variety of end user services utilized by the mobile computing devices 14(1)-14(n). In step 332, the diameter roaming gateway controller device 12 receives the Credit Control Request (CCR) from the Packet Data Network Gateway (P-GW) 28 in the Home Public Land and Mobile Network System (HPLMN) 16. In step 334, the diameter roaming gateway controller device 12 may send the Credit Control Request (CCR) to the Home Policy Charging Rules Function (PCRF) 30 in the Home Public Land and Mobile Network System (HPLMN) 16. In step 336, the Home Policy Charging Rules Function (PCRF) 30 in the Home Public Land and Mobile Network System (HPLMN) 16 may receive the Credit Control Request (CCR) from the diameter gateway device 12.

In step 338, the Home Policy Charging Rules Function (PCRF) 30 in the Home Public Land and Mobile Network System (HPLMN) 16 may send a Credit Control Answer (CCA) to the diameter roaming gateway controller device 12. In step 340 the diameter roaming gateway controller device 12 receives the Credit Control Answer (CCA) from the Home Policy Charging Rules Function (PCRF) 30 in the Home Public Land and Mobile Network System (HPLMN) 16.

In step 342, the diameter roaming gateway controller device 12 may add to the Credit Control Answer (CCA) a Redirect-Information Attribute Value Pair (AVP) which indicates the forward request from the Packet Data Network Gateway (P-GW) 28 in the Home Public Land and Mobile Network System (HPLMN) 16 towards the roaming landing server device 22. In step 344, the diameter roaming gateway controller device 12 sends the Credit Control Answer (CCA) with the Redirect-Information Attribute Value Pair (AVP) to the Packet Data Network Gateway (P-GW) 28 in the Home Public Land and Mobile Network System (HPLMN) 16.

In step 348, the Packet Data Network Gateway (P-GW) 28 in the Home Public Land and Mobile Network System (HPLMN) 16 may receive the Credit Control Answer (CCA) with the Redirect-Information Attribute Value Pair (AVP). In step 348, in response to receiving the receive the Credit Control Answer (CCA) with the Redirect-Information Attribute Value Pair (AVP), the Packet Data Network Gateway (P-GW) 28 in the Home Public Land and Mobile Network System (HPLMN) 16 may route all traffic from the roaming one of the mobile computing devices 14(1)-14(n) to the roaming landing server device 22 according to the redirect information in the Redirect-Information Attribute Value Pair (AVP), although the redirect may be to other systems, devices, components, and/or other elements.

Figure 4:
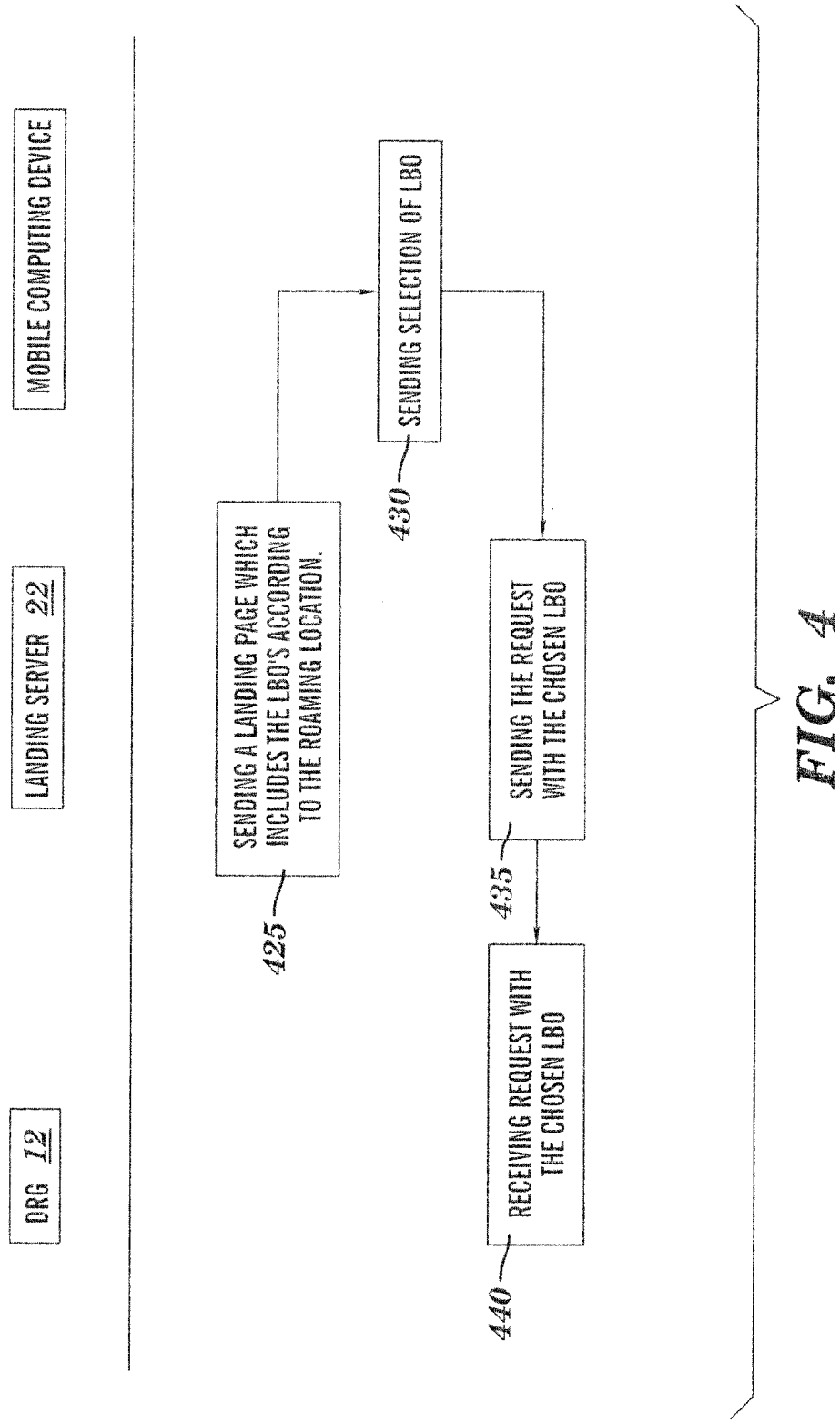
FIG. 4 is a flow diagram of an example of a method of selecting one of the offered roaming services.

Referring to FIG. 4 an example of a method of selecting one of the offered roaming services is illustrated and described. In step 425, in response to the routing of all traffic from the roaming one of the mobile computing devices 14(1)-14(n) to the roaming landing server device 22 according to the redirect information in the Redirect-Information Attribute Value Pair (AVP), the roaming landing server device 22 may identify one or more available roaming service providers based on to the roaming location of the roaming one of the mobile computing devices 14(1)-14(n) in the Visited Public Land and Public Network System (VPLMN) 18. Additionally, based on the identified one or more available roaming service providers, the roaming landing server device 22 may obtain or generate offers for roaming service provided by each of the roaming service providers including pricing and terms, such as the time period for which roaming service is provided and any data limits by way of example. Next, the roaming landing server device 22 may generate or populate a landing page with the one or more offers for roaming service and send the landing page to the roaming one of the mobile computing devices 14(1)-14(n).

In step 430, the roaming one of the mobile computing devices 14(1)-14(n) receives the landing page and may sends a selection of one of the offers for roaming service by one of the roaming service providers to the roaming landing server device 22. In step 435, the roaming landing server device 22 may send the request with the selected roaming service to the diameter roaming gateway controller device 12. In step 440, the diameter roaming gateway controller device 12 may receive the request with the selected roaming service.

Referring back to FIGS. 3A-3D, in step 352 the diameter roaming gateway controller device 12 receives the selection of the roaming service operator by the roaming one of the mobile computing devices 14(1)-14(n) from the roaming landing server device 12. In step 354, the diameter roaming gateway controller device 12 sends a delete subscriber data request (DSR) to the Mobility Management Entity (MME) 32 in the Visited Public Land and Public Network System (VPLMN) 18. In step 356, the Mobility Management Entity (MME) 32 in the Visited Public Land and Public Network System (VPLMN) 18 may execute delete subscriber data request and then send a delete subscriber data answer (DSA) to the diameter roaming gateway controller device 12. In step 358, the diameter roaming gateway controller device 12 receives the delete subscriber data answer (DSA) from the Mobility Management Entity (MME) 32 in the Visited Public Land and Public Network System (VPLMN) 18.

In step 360, the diameter roaming gateway controller device 12 may send an Insert-Subscription-Data-Request (IDR) with the AVP APN-OI-replacement of the roaming operator APN-FQDN, which instructs the Mobility Management Entity (MME) 32 in the Visited Public Land and Public Network System (VPLMN) 18 to reroute all Data requests to the roaming service provider associated with the selected roaming service.

In step 362, the Mobility Management Entity (MME) 32 in the Visited Public Land and Public Network System (VPLMN) 18 may receive the Insert-Subscription-Data-Request (IDR) with the AVP APN-OI-replacement of the roaming operator APN-FQDN. In step 364, the Mobility Management Entity (MME) 32 in the Visited Public Land and Public Network System (VPLMN) 18 may send an Insert-Subscription-Data-Answer (IDA) to the diameter roaming gateway controller device 12. In step 366, the diameter roaming gateway controller device 12 may receive the Insert-Subscription-Data-Answer (IDA) and from this point the roaming one of the mobile computing devices 14(1)-14(n) is provided with wireless communication services from the roaming service provider associated with the selected roaming service.

Accordingly, as illustrated and described by way of reference to the examples herein, this technology provides a number of advantages including providing methods, non-transitory computer readable medium, and devices that optimize establishing connections to and facilitating offers of roaming services. With this technology, connections are established to identify available visiting networks are identified and presented before starting to consume wireless communication services. Additionally, with this technology an identified roaming mobile computing device is presented with a landing page which offers a list of one or more available roaming providers.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for optimizing establishing connections to and facilitating offers of roaming services, the method comprising:
adding, by a diameter roaming gateway controller device, a domain name of a packet data network gateway in the home network system to an update location answer received in response to an update location request from a home subscriber system in a home network system associated with a roaming mobile computing device;
sending, by the diameter roaming gateway controller device, the update location answer to a mobility management entity in a visited network;
adding, by the diameter roaming gateway controller device, redirect information to a credit control answer received from the policy charging and rules function element in the home network system in response to a credit control request message generated by a packet data network gateway in the home network system, wherein the redirect information provides instruction to route communications from the roaming mobile computing device to a landing server device; and
receiving, by the diameter roaming gateway controller device, an update on a roaming provider for the roaming mobile computing device from the mobility management entity in the visited network which received a selection of the roaming provider from the landing server device.

2. The method as set forth in claim 1 wherein the adding the domain name of the packet data network gateway in the home network system to the update location answer further comprises:
adding, by the diameter roaming gateway controller device, an attribute value pair which includes the domain name of the packet data network gateway in the home network system to the update location answer.

3. The method as set forth in claim 1 further comprising:
receiving, by the diameter roaming gateway controller device, the update location request received from the mobility management entity in the visited network system associated with the roaming mobile computing device;
sending, by the diameter roaming gateway controller device, the update location request to the home subscriber system in the home network system associated with a roaming mobile computing device; and
receiving, by the diameter roaming gateway controller device, the update location answer received in response to the update location request from the home subscriber system in the home network system associated with the roaming mobile computing device.

4. The method as set forth in claim 1 further comprising:
receiving, by the diameter roaming gateway controller device, the credit control request message received from a packet data network gateway in the home network system;
sending, by the diameter roaming gateway controller device, the credit control request message to a policy charging and rules function element in the home network system; and
receiving, by the diameter roaming gateway controller device, the credit control answer in response to the credit control request message from the policy charging and rules function element in the home network system.

5. The method as set forth in claim 1 wherein the adding redirect information to the credit control answer received from the policy charging and rules function element in the home network system further comprises:
adding, by the diameter roaming gateway controller device, an attribute value pair to the credit control answer to route communications from the roaming mobile computing device to a landing server device.

6. The method as set forth in claim 1 further comprising sending, by the diameter roaming gateway controller device, a request to delete any other subscriber data requests associated with the roaming mobile computing device to the mobility management entity in the visited network system.

7. A non-transitory computer readable medium having stored thereon instructions for optimizing establishing connections to and facilitating offers of roaming services comprising executable code which when executed by a processor, causes the processor to perform steps comprising:
adding a domain name of a packet data network gateway in the home network system to an update location answer received in response to an update location request from a home subscriber system in a home network system associated with a roaming mobile computing device;
sending the update location answer to a mobility management entity in a visited network;
adding redirect information to a credit control answer received from the policy charging and rules function element in the home network system in response to a credit control request message generated by a packet data network gateway in the home network system, wherein the redirect information provides instruction to route communications from the roaming mobile computing device to a landing server device; and
receiving an update on a roaming provider for the roaming mobile computing device from the mobility management entity in the visited network which received a selection of the roaming provider from the landing server device.

8. The medium as set forth in claim 7 wherein the adding the domain name of the packet data network gateway in the home network system to the update location answer further comprises:
adding an attribute value pair which includes the domain name of the packet data network gateway in the home network system to the update location answer.

9. The medium as set forth in claim 7 further comprising:
receiving the update location request received from the mobility management entity in the visited network system associated with the roaming mobile computing device;
sending the update location request to the home subscriber system in the home network system associated with a roaming mobile computing device; and
receiving the update location answer received in response to the update location request from the home subscriber system in the home network system associated with the roaming mobile computing device.

10. The medium as set forth in claim 7 further comprising:
receiving the credit control request message received from a packet data network gateway in the home network system;
sending the credit control request message to a policy charging and rules function element in the home network system; and
receiving the credit control answer in response to the credit control request message from the policy charging and rules function element in the home network system.

11. The medium as set forth in claim 7 wherein the adding redirect information to the credit control answer received from the policy charging and rules function element in the home network system further comprises:
adding an attribute value pair to the credit control answer to route communications from the roaming mobile computing device to a landing server device.

12. The medium as set forth in claim 7 further comprising sending a request to delete any other subscriber data requests associated with the roaming mobile computing device to the mobility management entity in the visited network system.

13. A diameter roaming gateway controller device comprising:
at least one processor; and
a memory coupled to the processor which is configured to be capable of executing programmed instructions comprising and stored in the memory to:
add a domain name of a packet data network gateway in the home network system to an update location answer received in response to an update location request from a home subscriber system in a home network system associated with a roaming mobile computing device;
send the update location answer to a mobility management entity in a visited network;
add redirect information to a credit control answer received from the policy charging and rules function element in the home network system in response to a credit control request message generated by a packet data network gateway in the home network system, wherein the redirect information provides instruction to route communications from the roaming mobile computing device to a landing server device; and receive an update on a roaming provider for the roaming mobile computing device from the mobility management entity in the visited network which received a selection of the roaming provider from the landing server device.

14. The device as set forth in claim 13 wherein the processor coupled to the memory is further configured to be capable of executing at least one additional programmed instruction to add the domain name of the packet data network gateway in the home network system to the update location answer further comprising and stored in the memory to:

add an attribute value pair which includes the domain name of the packet data network gateway in the home network system to the update location answer.

15. The device as set forth in claim 13 wherein the processor coupled to the memory is further configured to be capable of executing at least one additional programmed instruction further comprising and stored in the memory to:

receive the update location request received from the mobility management entity in the visited network system associated with the roaming mobile computing device;

send the update location request to the home subscriber system in the home network system associated with a roaming mobile computing device; and receive the update location answer received in response to the update location request from the home subscriber system in the home network system associated with the roaming mobile computing device.

16. The device as set forth in claim 13 wherein the processor coupled to the memory is further configured to be capable of executing at least one additional programmed instruction further comprising and stored in the memory to:

receive the credit control request message received from a packet data network gateway in the home network system;

send the credit control request message to a policy charging and rules function element in the home network system; and receive the credit control answer in response to the credit control request message from the policy charging and rules function element in the home network system.

17. The device as set forth in claim 13 wherein the processor coupled to the memory is further configured to be capable of executing at least one additional programmed instruction to add redirect information to the credit control answer received from the policy charging and rules function element in the home network system further comprising and stored in the memory to:

add an attribute value pair to the credit control answer to route communications from the roaming mobile computing device to a landing server device.

18. The device as set forth in claim 13 wherein the processor coupled to the memory is further configured to be capable of executing at least one additional programmed instruction further comprising and stored in the memory to: send a request to delete any other subscriber data requests associated with the roaming mobile computing device to the mobility management entity in the visited network system.

* * * * *